US008660322B2

(12) United States Patent
Tsai et al.

(10) Patent No.: US 8,660,322 B2
(45) Date of Patent: Feb. 25, 2014

(54) PASSIVE CONTINUOUS AUTHENTICATION METHOD

(75) Inventors: Pei-Wei Tsai, Riyadh (SA); Muhammad Khurram Khan, Riyadh (SA)

(73) Assignee: King Saud University, Riyadh (SA)

( * ) Notice: Subject to any disclaimer, the term of this patent is extended or adjusted under 35 U.S.C. 154(b) by 385 days.

(21) Appl. No.: 13/218,411

(22) Filed: Aug. 25, 2011

(65) Prior Publication Data
US 2013/0051632 A1 Feb. 28, 2013

(51) Int. Cl.
*G06K 9/62* (2006.01)
(52) U.S. Cl.
USPC .......................................................... 382/118
(58) Field of Classification Search
None
See application file for complete search history.

(56) References Cited

U.S. PATENT DOCUMENTS

| 5,229,764 | A | 7/1993 | Matchett et al. |
|---|---|---|---|
| 6,111,517 | A | 8/2000 | Atick et al. |
| 7,039,221 | B1 | 5/2006 | Tumey et al. |
| 7,636,700 | B2 | 12/2009 | Owechko et al. |
| 7,647,638 | B2 | 1/2010 | Furuyama |
| 7,672,911 | B2 | 3/2010 | Owechko et al. |
| 2004/0080790 | A1 | 4/2004 | Abe |
| 2006/0088187 | A1 | 4/2006 | Clarkson et al. |
| 2006/0288234 | A1 | 12/2006 | Azar et al. |
| 2008/0304743 | A1 | 12/2008 | Tang et al. |
| 2009/0185723 | A1 | 7/2009 | Kurtz et al. |
| 2009/0189736 | A1 | 7/2009 | Hayashi |
| 2009/0220127 | A1* | 9/2009 | Bedros et al. ................. 382/118 |

FOREIGN PATENT DOCUMENTS

WO WO 2007055745 A2 5/2007

OTHER PUBLICATIONS

"Enhanced Artificial Bee Colony Optimization", Tsai et al., *International Journal of Innovative Computing, Information and Control ICIC International c O2009* ISSN 1349-4198 vol. 5, No. 12, Dec. 2009.
"Soft Biometric Traits for Continuous User Authentication," Niinuma et al., IEEE Transactions on Information Forensics and Security, vol. 5, No. 4, Dec. 2010.
"Facial Recognition in Uncontrolled Conditions for Information Security," Xiao et al., EURASIP Journal on Advances in Signal Processing, vol. 2010, Article ID 345743, 9 pages doi:10.1155/2010/345743.
"Continuous Verification Using Multimodal Biometrics,"Zhang et al., Advances in Biometrics, Lecture Notes in Computer Science, 2005, vol. 3832/2005, 562-570, DOI: 10.1007/11608288_75.

* cited by examiner

*Primary Examiner* — Brian P Werner
(74) *Attorney, Agent, or Firm* — Richard C. Litman

(57) ABSTRACT

The passive continuous authentication method uses biometric feedback to perform the authentication processes. Computer software and sensors are provided to acquire, memorize, and authenticate both the user's hard (facial) and soft (clothing) biometric information. A registration phase compels the user to register his/her face image into a registration database. Subsequently, the system permits the user to login the system based on facial recognition of the image presented by an attached webcam of the system. During a computing session the system repetitively authenticates the user's identity by comparing the user's acquired face image (hard biometric) to the registered face image in the database. A clothes color histogram (soft biometric) is also computed. The hard biometric recognition mainly decides the authentication result. Otherwise, clothes color histogram matching takes place to decide the result. When the user leaves the terminal the screen locks up. Successful authentication unlocks the screen upon user return.

20 Claims, 7 Drawing Sheets

PASSIVE CONTINUOUS AUTHENTICATION METHOD

BACKGROUND OF THE INVENTION

1. Field of the Invention

The present invention relates to computer security, and particularly to a passive continuous authentication method for authenticating an authorized user of a computing resource.

2. Description of the Related Art

With a typical user login and password to use a computer, conventional authentication systems only request the user to login to the system when they start to use the computer or a terminal. However, the machine basically lacks the information to know who is using it. If the authorized user temporarily leaves the terminal without locking up the system, thus requiring login again after the user comes back, the security leak appears right away. Anyone can sneak up to the computer to do anything, and nobody can know who used the computer. In order to prevent such security leaks in a conventional authentication system, the user suffers from having to frequently login and lock up screen processes.

Thus, a passive continuous authentication method solving the aforementioned problems is desired.

SUMMARY OF THE INVENTION

The passive continuous authentication method uses biometric feedback to perform the authentication process. Computer software and sensors are provided to acquire, memorize, and authenticate both the user's hard and soft biometric information, e.g., facial details and clothing color. Using this biometric information, the computer can continuously authenticate whether the person using the terminal is a valid user.

The system has a registration phase and an authentication phase. The registration phase compels the user to register his/her facial image into a registration database. Subsequently, the system permits the user to login the system based on facial recognition of the image presented by an attached webcam of the system. During a computing session, the system repetitively authenticates the user's identity by comparing the user's acquired face image (hard biometric) to the registered face image in the database. A clothes' color histogram (soft biometric) is also computed.

If the front face image can be retrieved, the hard biometric recognition mainly decides the result of the authentication. Otherwise, the clothes color histogram matching will take place to decide the result.

When the system detects that the user has left the terminal, the screen will be locked up. After the user comes back, the system will automatically login the recognized user again, without re-entering ID and password.

The passive continuous authentication system currently uses IABC supported principal component analysis (PCA)-based face recognition to authenticate the user's face, but the recognition can also be done by kernel matrix operations utilized in support vector machines (SVM) or supported by some soft computing methods. It can be combined with any authentication system, e.g., the banking/military/business/online exam system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 7:
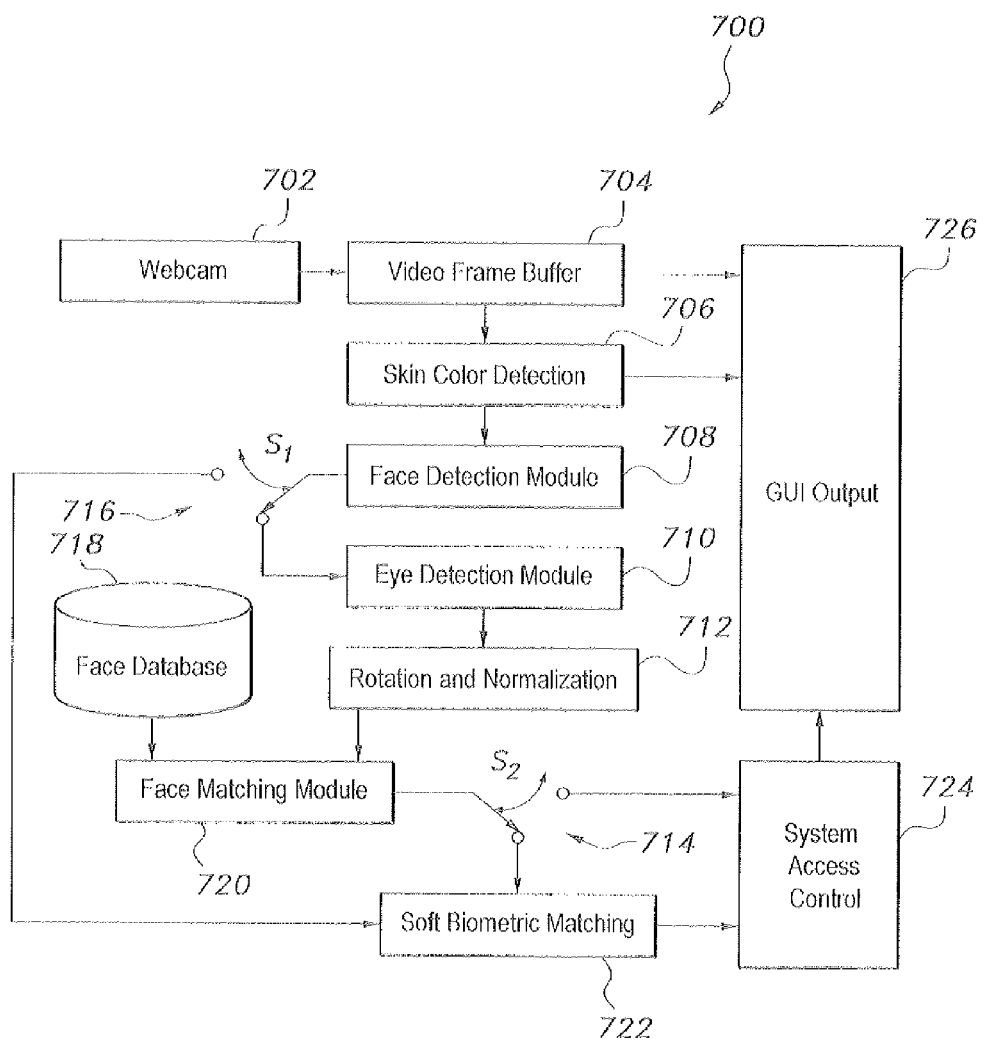
FIG. 7 is a block diagram of an exemplary system architecture for implementing a passive continuous authentication method according to the present invention.

A system for implementing the passive continuous authentication method, as shown in FIG. 7, is able to authenticate and memorize a user's hard and soft biometric information, e.g., facial details and clothes' color, and to continuously authenticate whether the person using the terminal is the valid, authenticated user. An exemplary system 700 includes a webcam 702 connected to a video frame buffer 704, which is connected to a GUI output 726 and a skin color detector 706. The skin color detector 706 is connected to the GUI output and a face detection module 708. The face detection module 708 has an output connected via a switch 716 ($S_1$) to either the eye detection module 710 or to a soft biometric matching module 722. The eye detection module 710 is connected to a rotation and normalization module 712. A face database 718 and the rotation and normalization module 712 are connected to face-matching module 720. The face-matching module 720 is connected either to a system access control module 724 or to the soft biometric matching module 722 via a switch 714 ($S_2$). The system access control module 724 is connected to lock or unlock the GUI output 726.

The passive continuous authentication (CA) method uses Interactive Artificial Bee Colony (IABC) optimization for assisting the recognition of the user's hard and soft biometric information. IABC is a recent enhanced optimization algorithm in the branch of swarm intelligence. IABC is used for recognition of hard biometric data. Hard biometric matching results have the highest priority (are preferred) to effect the authentication result. Soft biometric matching is a support system to assist the authentication process. Via a system access controller 724, the system locks up the screen based upon the knowledge it receives by detecting the absence of the authorized user from the view of the screen (or webcam 702). The design of the system 700 only requires a single computer-based device and presents a light computation load.

During the period of time when the user is working on the computer, the user is not interrupted by the authentication system because it is passive, not requiring interaction from the user.

The exemplary embodiment requires six images stored for each authorized user. Moreover, the system uses Eigenface with regular PCA decomposition and Eigenface with IABC supported weighting mask. The system checks the same location in continuously different video frames. Additionally, skin region detection and swarm intelligence is employed.

Figure 1:
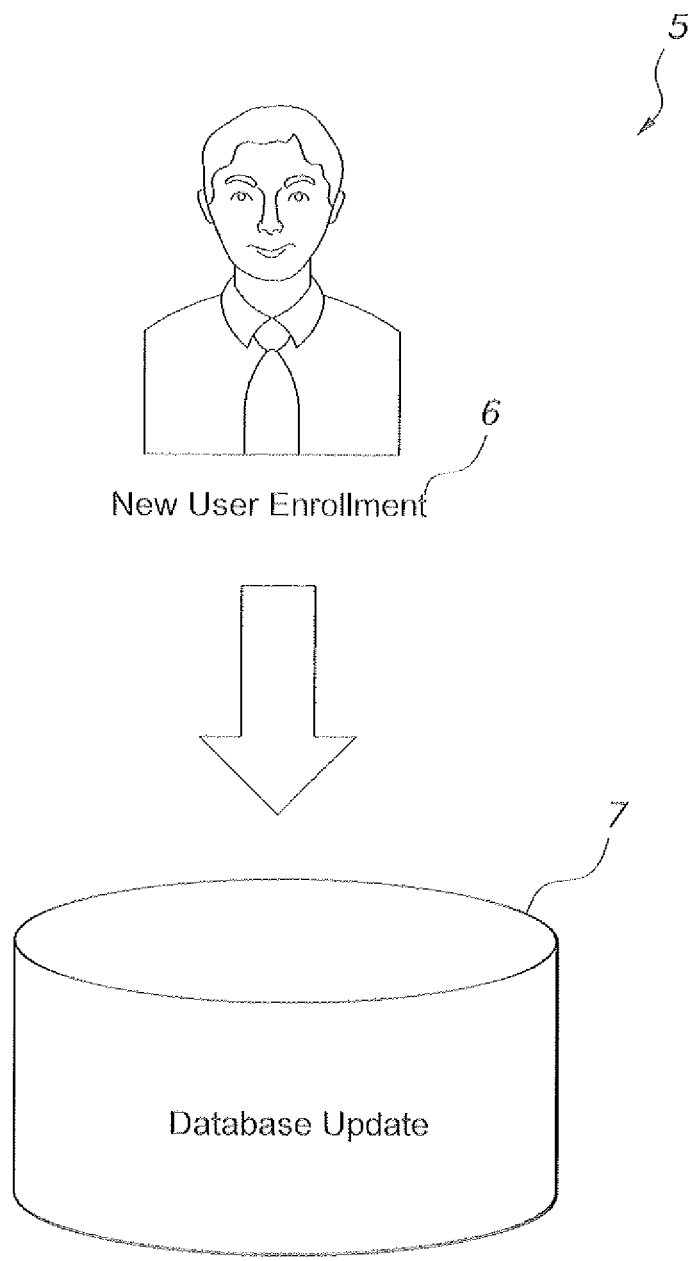
FIG. 1 is a block diagram of steps of a registration process of a passive continuous authentication method according to the present invention.
Figure 4:
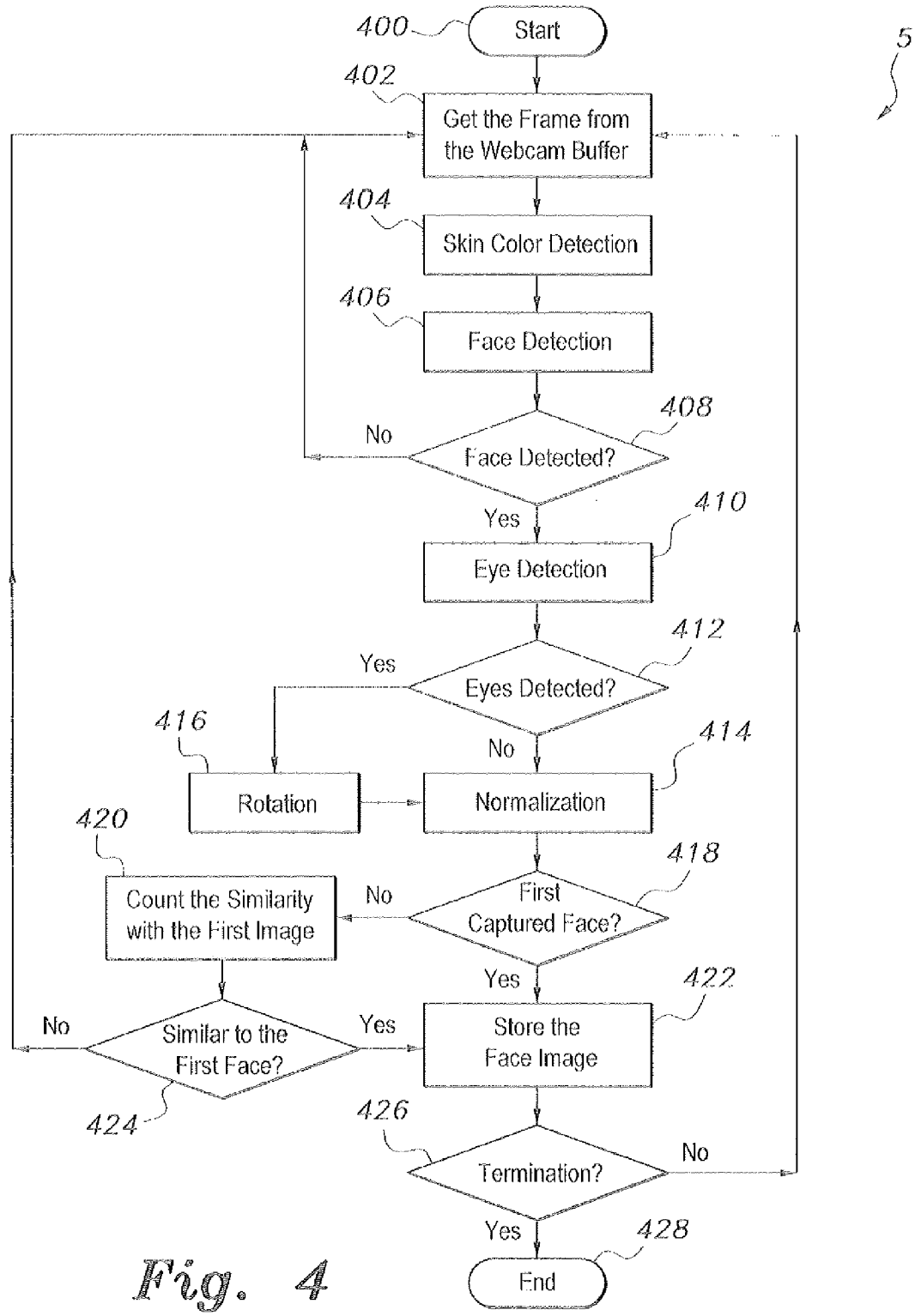
FIG. 4 is a detailed flowchart of the registration phase of a passive continuous authentication method according to the present invention.

The system has a registration phase and an authentication phase. As shown in FIG. 1, the registration phase 5 entails a new user 6 submitting his/her image to a database update record 7. The registration phase 5 compels the user to register his/her face image into the registration database. As shown in FIG. 4, the registration phase 5 includes the steps of starting 400 by acquiring a webcam video frame 402, detecting the user's skin color 404, detecting the user's face 406, making sure the face was detected 408, detecting the user's eyes 410, making sure the eyes are detected 412 and rotating the frame of the face 416, normalizing the face region 414, checking if any face image has been saved 418, performing a similarity check 420, validating similarity 424, storing the face image 422, performing a termination check 426, and terminating the procedure 428.

Figure 2:
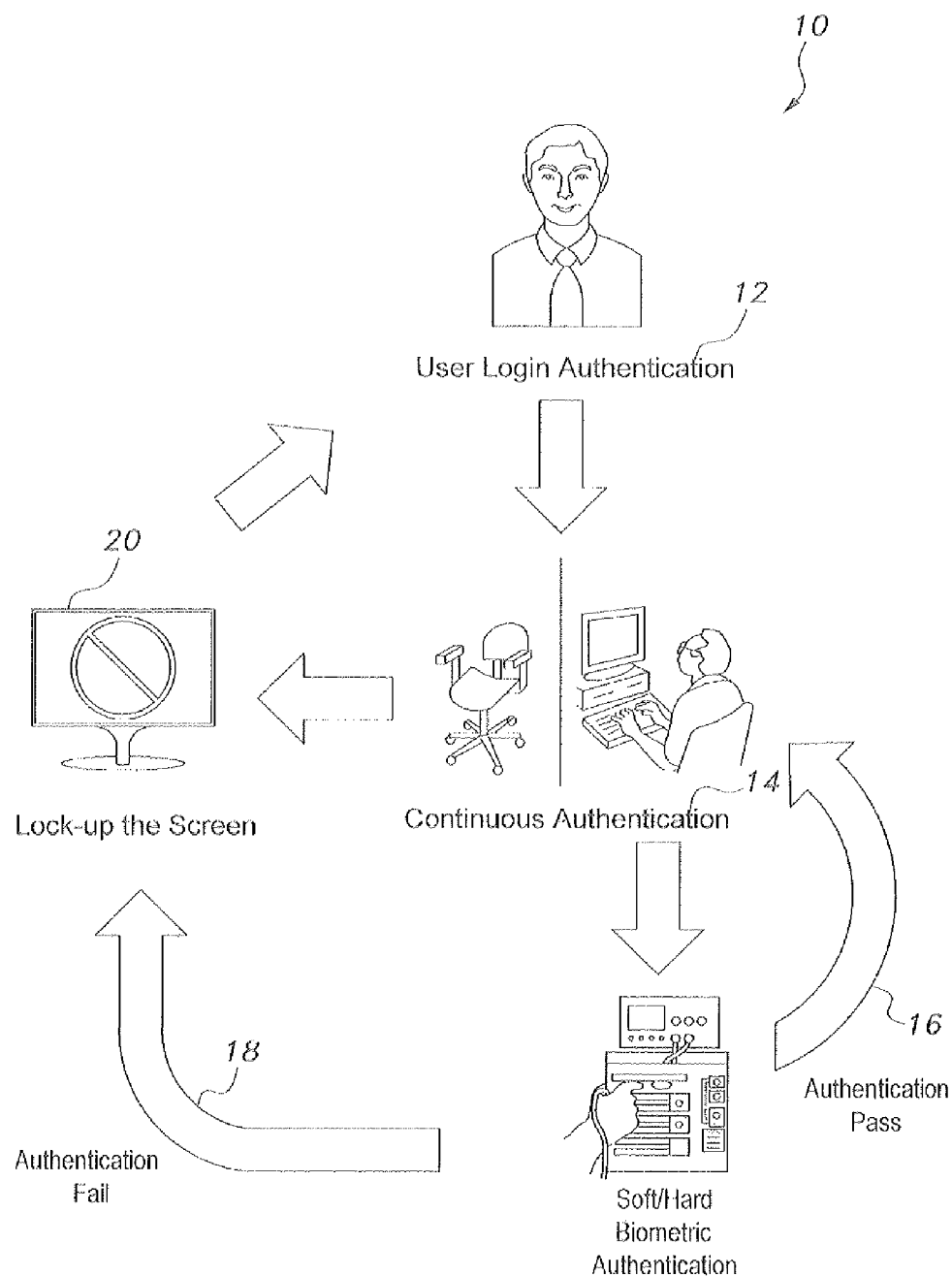
FIG. 2 is a block diagram illustrating steps of a passive continuous authentication method according to the present invention.

As shown in FIG. 2, the procedure 10 requires a registered user to authenticate 12 for access to the computer. Subsequently, the system permits the user to login to the system based on facial recognition of the image presented by an attached webcam of the system. During a computing session a continuous authentication 14 is performed, during which the user's identity, i.e., the acquired face image (hard biometric) is compared to the registered face image in the database. A clothes color histogram (soft biometric) is also computed.

Figure 3:
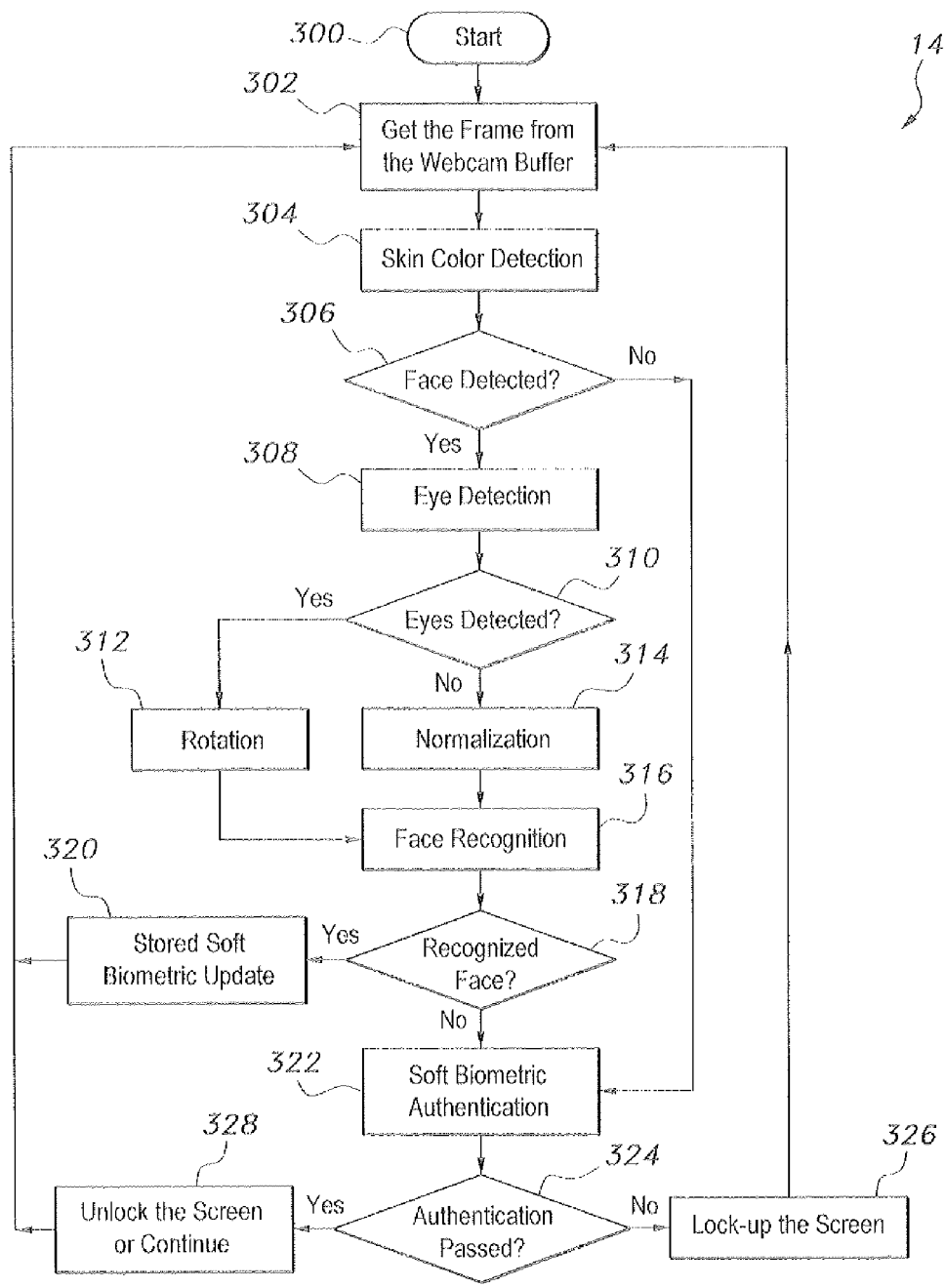
FIG. 3 is a flowchart showing the steps of a passive continuous authentication method according to the present invention.

An authentication pass 16 allows the user to maintain access to the computing resource. An authentication fail 18 denies the user access by lock-up of the screen 20. Referring to FIG. 3, the detailed steps of the authentication phase 14 include a start step 300, frame buffer acquisition 302, skin color detection 304, a face detection query 306, eye detection 308, an eye detection query 310, rotation step 312 if the eyes are detected, a normalization step 314, a face recognition step 316, a face recognition query step 318, a stored soft biometric update 320, a soft biometric authentication 322, an authentication query 324, screen lock 326 if the authentication fails, and screen unlock 328 if the authentication passes.

Figure 5:
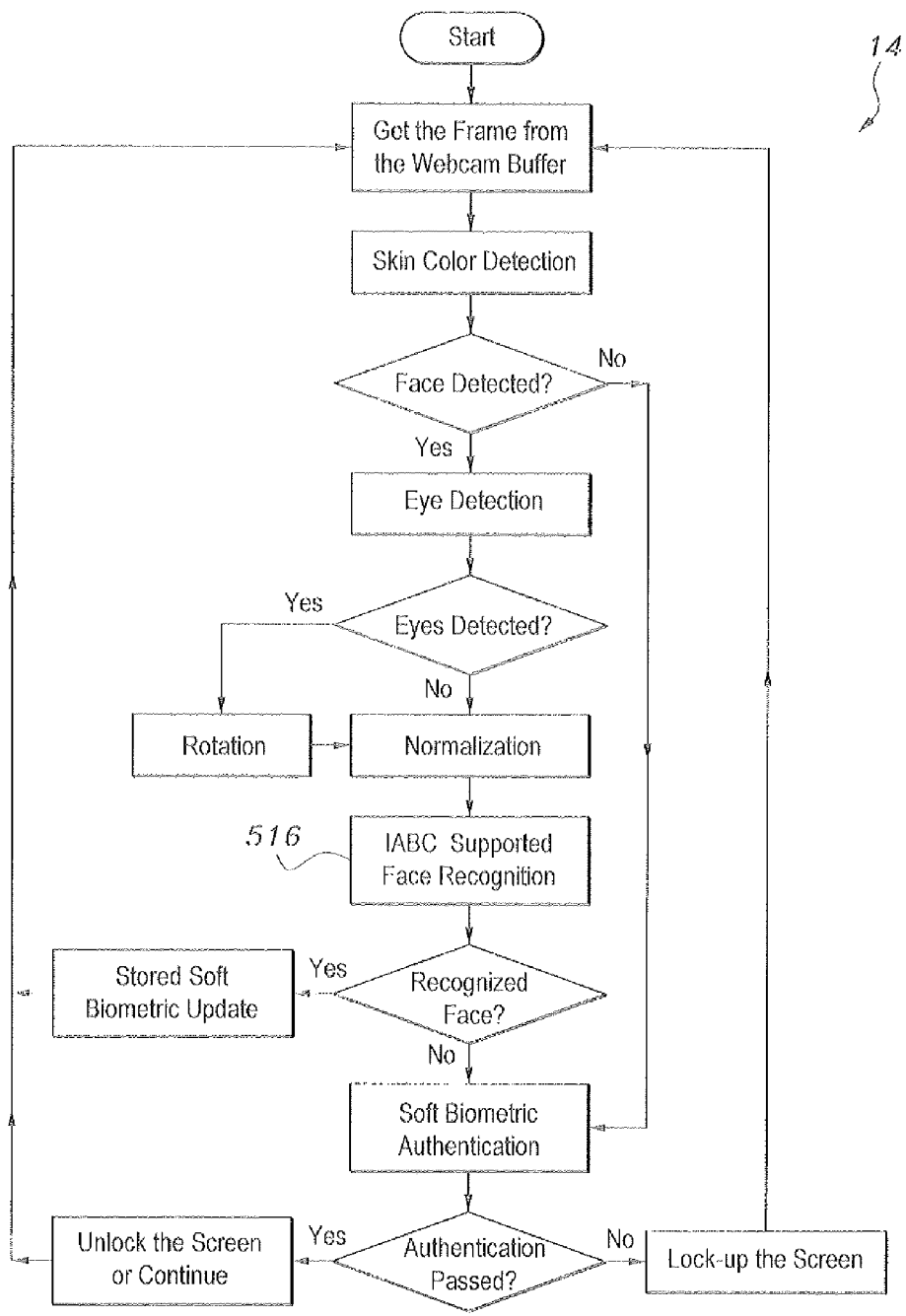
FIG. 5 is a flowchart of a passive continuous authentication method according to the present invention that uses IABC face recognition.
Figure 6:
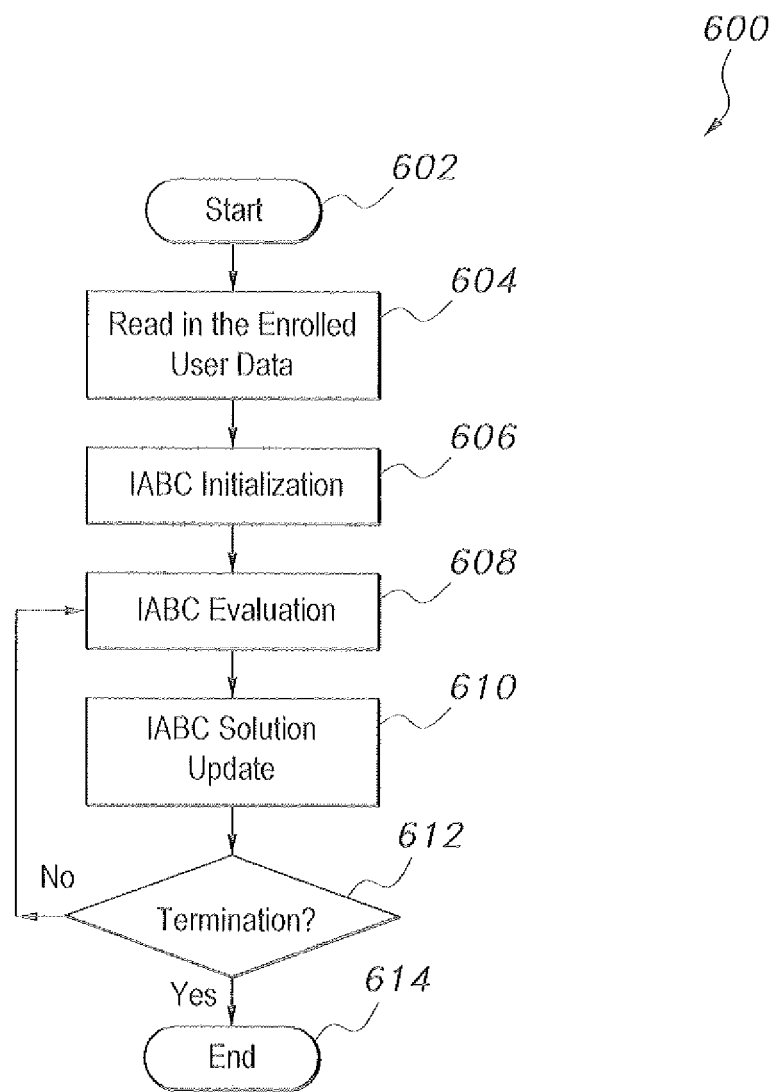
FIG. 6 is a flowchart of a weighing mask training process of a passive continuous authentication method according to the present invention that uses IABC.

As shown in FIG. 5, the generic face recognition 316 is preferably replaced with a specialized Interactive Artificial Bee Colony (IABC)-supported face recognition step 516. Referring to FIG. 6, utilization of IABC requires a training procedure 600 having the detailed steps of starting 602, reading enrolled user data 604, initializing the IABC 606, evaluating the IABC 608, updating the IABC solution 610, a termination query 612, and terminating the training session 614.

If the front face image can be retrieved, the hard biometric recognition mainly decides the result of the authentication. Otherwise, the clothes color histogram matching will take place to decide the result.

When the system detects that the user has left the terminal, the system locks up the screen. After the user comes back, if recognized by the system, the system automatically logs the user in again without requiring re-entry of user ID and password.

The system uses principal component analysis (PCA)-based face recognition to authenticate the user's face, but the recognition can also be done by kernel matrix operations utilized in support vector machines (SVM) or supported by some soft computing methods. An advantage of PCA is that the principal components of PCA yield a relaxed solution of K-means clustering specified by cluster indicators. The passive continuous authentication method exploits this relation during offline training of image data weighting masks. The authentication method can be combined with any authentication system, e.g., the banking/military/business/online exam system.

The registered user logs into the system either by face recognition, or by the account and password. After verifying the user's identity, the system unlocks the screen for the user to use the computer. In addition, the system keeps authenticating the user by recognizing the face image captured by the webcam. The authentication process will keep repeating. If the face recognition result indicates that the face is unrecognizable, the histogram of the bounding box, which constructs a region under the detected skin color pixels, will be matched with the bounding box saved from the latest frame that contains a recognized face. If the similarity from the matching result indicates that two bounding boxes are dissimilar and the same result appears continuously in a predefined number of frames, the system will reject the user and automatically lock-up the screen. The authentication status moves back to the user login phase, again.

The system keeps authenticating the user, and will login/logoff the user automatically based on recognizing the hard/soft biometric from the registered user.

The registration process uses the same process to detect the face in the input frame. In an exemplary embodiment of the system, a user is required to register six images. The captured faces will be stored only if they are somehow similar to the other images of the same user stored in the database. Otherwise, the captured face will be ignored. The similarity score can be calculated by Mahalanobis distance, Euclidean distance, or any distance measurement. The termination condition of the registration in the system is set to capture the predefined number of images of the user.

The system only allows the recognized user to access the data. The user is not frequently interrupted by requests for password entry to authenticate the user's identity, due to the system being designed to be passive. The security level is adjustable by the user, since both hard biometric and soft biometric authentications provide the similarity scores.

The system can be embedded in any device with a webcam. Passive continuous authentication won't let the user feel any different, even if the system is authenticating him. It can be combined with an automated teller machine (ATM), a smart phone, a trip computer, a laptop or desktop, an access control system, a military device, or any system that holds sensitive data because there is no hardware dependency.

The passive continuous authentication system starts with the operating system in the computer. When the user boots the computer, the system replaces the login interface of the Windows® or other proprietary Operating System (OS). The authorized user will be able to login to his/her account by letting the webcam capture his/her face.

After login to the OS, the user can use the computer as normal. However, the system keeps authenticating the user's identity passively by recognizing the hard and soft biometric information captured from the webcam. The user will not be interrupted from his/her work by the system because it doesn't ask the user to provide any extra authentication item, e.g. password or user account.

The system can be developed in C++, and is capable of being built in any computer system and may be embodied in a general purpose computer having the appropriate peripherals attached thereto and software stored on a computer readable media that can be loaded into main memory and executed by a processing unit to carry out the functionality of the apparatus and steps of the method described herein. There is no specific hardware or software for the security measurement. The result is clear and easy to be judged by the user directly. If the user is absent from the viewing area of the system webcam, the screen will be locked up.

In the system, the $YC_bC_r$ color model is utilized to extract the skin color for locating the potential face regions. The system includes a cascade of boosted classifiers, which work with Haar-like features in which image subsections are categorized in order to detect the frontal face. Haar-like feature detection is known by skilled artisans and commonly employed in facial detection algorithms. The same algorithm with different Haar-like features is used to detect the location of the eyes in the face. The eye location helps to calculate the rotation angle of the face, and it is used to rotate the face to be horizontal. An IABC-supported weighting mask is used in conjunction with an Eigenface method to decompose the face image for the face recognition. The use of weighting masks in the determination of object classification with respect to similar reference objects is discussed in United States Patent Publication 2008/0304743, published Dec. 11, 2008, which is hereby incorporated by reference in its entirety. The similarity of the face image is calculated by Euclidean distance. The weighting mask is trained by IABC offline after the new user is enrolled in the database.

Optimization of a weighting mask by evolutionary computation methods, such as artificial bee colony (ABC) optimization, is known in the art, an example being U.S. Patent Publication 2004/0080790, published Apr. 29, 2004, which is hereby incorporated by reference in its entirety. However, the inventors' Interactive Artificial Bee Colonization (IABC), it is believed, has heretofore not been used in optimizing a weighting mask used in conjunction with an Eigenface method to decompose a face image for face recognition.

The weighting mask being trained by the Interactive Artificial Bee Colony (IABC) optimization strategy produces an optimized weighting mask from the face images stored in the user image database on the corresponding eigen vectors. When in the authentication processes, the weighting mask affects the calculation result of the Eigenface method directly. The weighting mask is trained offline after the new user is enrolled into the database. The fitness function of an IABC is defined as employing a "within cluster" distance and a "between cluster" distance for the mask training.

For soft biometric recognition, Euclidean distance is used to measure the similarity on the histogram in the RGB channels.

Portions of the discussion below of IABC training is extracted from a journal article written by the first named inventor, Dr. Tsai, entitled "Enhanced Artificial Bee Colony Optimization", and published in the International Journal of Innovative Computing, Information and Control, Volume 5, Number 12 (December 2009).

An enhanced Artificial Bee Colony (ABC) optimization algorithm is called Interactive Artificial Bee Colony (IABC) optimization, and is used for numerical optimization problems.

An onlooker bee is designed to move in a straight trajectory to the picked coordinate indicated by an employed bee and evaluate the fitness values near it in the original Artificial Bee Colony algorithm in order to reduce the computational complexity. Hence, the exploration capacity of the ABC is constrained to a zone.

Based on the framework of the ABC, the IABC introduces the concept of universal gravitation into the consideration of the effect between employed bees and the onlooker bees. By assigning different values of the control parameter, the universal gravitation should be involved for the IABC when there are various quantities of employed bees and a single onlooker bee. Therefore, the exploration ability is redeemed about on average in the IABC.

In recent years, swarm intelligence becomes more and more attractive for the researchers, who work in the related research field. It can be classified as one of the branches of evolutionary computing. Swarm intelligence can be defined as the measure introducing the collective behavior of social insect colonies or other animal societies to design algorithms or distributed problem solving devices. Generally, the algorithms in swarm intelligence are applied to solve optimization problems. The classical algorithm in evolutionary computing that is used to solve problems of optimization is the Genetic Algorithm (GA). Subsequently, many swarm intelligence algorithms for solving problems of optimization have been proposed, such as Cat Swarm Optimization (CSO), Parallel Cat Swarm Optimization (PCSO), Artificial Bee Colony (ABC), Particle Swarm Optimization (PSO), Fast Particle Swarm Optimization (FPSO), and Ant Colony Optimization (ACO). Moreover, several applications of optimization algorithms based on computational intelligence or swarm intelligence are also presented, one after another.

Karaboga proposed the Artificial Bee Colony (ABC) algorithm based on a particular intelligent behavior of the honeybee swarms in 2005. In addition, the accuracy and the efficiency of the ABC have been compared with the Differential Evolution (DE), the PSO and the Evolutionary Algorithm (EA) for numeric problems with multidimensions.

By observing the operation and the structure of the ABC algorithm, we notice that the operation of the agent, e.g., the artificial bee, can only move straight to one of the nectar sources of those are discovered by the employed bees. Nevertheless, this characteristic may narrow down the zones of which the bees can explore and may become a drawback of the ABC. Hence, we propose an interactive strategy by considering the universal gravitation between the artificial bees for the ABC to retrieve the disadvantages. To test and verify the advantages, which we gain in the proposed method, a series of experiments were executed and compared with the original ABC and the PSO. The experiments' results were that the IABC performs the best on solving the problems of numerical optimization.

The Artificial Bee Colony Optimization Algorithm was proposed by Karaboga in 2005, and the performance of ABC was analyzed in 2007. The ABC algorithm is developed by inspecting the behaviors of the real bees on finding a food source, which is called the nectar, and sharing the information of food sources to the bees in the nest.

In the conventional ABC algorithm, the artificial agents are defined and classified into three types, namely, the employed bee, the onlooker bee, and the scout. Each of them plays a different role in the process. The employed bee stays on a food source and provides the neighborhood of the source in its memory. The onlooker gets the information of food sources from the embayed bees in the hive and selects one of the food sources to gather the nectar. The scout is responsible for finding new food sources, i.e., the new nectar. The process of the ABC algorithm is presented as follows:

Step 1 is Initialization. Spray $n_e$ percentage of the populations into the solution space randomly, and then calculate their fitness values, which are called the nectar amounts, where $n_e$ represents the ratio of employed bees to the total population. Once these populations are positioned into the solution space, they are called the employed bees.

Step 2 is Move the Onlookers. Calculate the probability of selecting a food source by equation (1), characterized by the relation:

$$P_i = \frac{F(\theta_i)}{\sum_{k=1}^{S} F(\theta_k)} \quad (1)$$

where $\theta_i$ denotes the position of the $i^{th}$ employed bee, S represents the number of employed bees, and $P_i$ is the probability of selecting the $i^{th}$ employed bee.

Select a food source to move to by roulette wheel selection for every onlooker bee, and then determine the nectar amounts of them. The movement of the onlookers follows equation (2), characterized by the relation:

$$x_{ij}(t+1) = \theta_{ij} + \phi(\theta_{ij}(t) - \theta_{kj}(t)), \quad (2)$$

where $x_i$ denotes the position of the $i^{th}$ onlooker bee, t denotes the iteration number, $\theta_k$ is the randomly chosen employed bee, j represents the dimension of the solution and $\phi(\ )$ produces a series of random variables in the range $[-1, 1]$.

Step 3 is Move the Scouts. If the fitness values of the employed bees are not improved by a continuous predetermined number of iterations, which is called the Limit, those food sources are abandoned, and these employed bees become the scouts. The scouts are moved by equation (3) characterized by the relation:

$$\theta_{ij} = \theta_{ij\,min} + r \cdot (\theta_{ij\,max} - \theta_{ij\,min}), \quad (3)$$

where r is a random number and $r \in [0, 1]$.

Step 4 is Update the Best Food Source Found So Far. Memorize the best fitness value and the position, which are found by the bees.

Step 5 is Termination Checking. Check if the amount of the iterations satisfies the termination condition. If the termination condition is satisfied, terminate the program and output the results. Otherwise, go back to the Step 2.

In general the ABC algorithm works well on finding the better solution of the object function. However, the original design of the onlooker bee's movement only considers the relation between the employed bee, which is selected by the roulette wheel selection, and the one selected randomly. Therefore, it is not strong enough to maximize the exploitation capacity.

On the other hand, the Interactive Artificial Bee Colony algorithm is proposed based on the structure of ABC algorithm. By employing the Newtonian law of universal gravitation described in equation (4), characterized by the relation:

$$F_{12} = G \frac{m_1 m_2}{r_{21}^2} \hat{r}_{21}, \quad (4)$$

the universal gravitation between the onlooker bee and the selected employed bees is exploited.

In equation (4), $F_{12}$ denotes the gravitational force heads from the object 1 to the object 2, G is the universal gravitational constant, $m_1$ and $m_2$ are the masses of the objects, while $r_{21}$ represents the separation between the objects, and $\hat{r}_{21}$ denotes the unit vector in equation (5), below:

$$\hat{r}_{21} = \frac{r_2 - r_1}{|r_2 - r_1|} \quad (5)$$

In the IABC algorithm, the mass $m_1$ is substituted by the parameter, $F(\theta_i)$, which is the fitness value of the employed bee that was picked by applying the roulette wheel selection. The mass, $m_2$, is substituted by the fitness value of the randomly selected employed bee, and is denoted by the symbol $F(\theta_k)$. The universal gravitation in the equation (4) is formed in vector format. Hence, the quantities of it on different dimensions can be considered independently. Therefore, $r_{21}$ is calculated by taking the difference between the objects only on the currently concerned dimension, and the universal gravitation on each dimension is calculated independently. In other words, the intensity of the gravitation on different dimensions is calculated one by one. Thus, the gravitation on the $j^{th}$ dimensions between $\theta_i$ and $\theta_k$ can be formed in equation (6), below;

$$F_{ikj} = G \frac{F(\theta_i) \cdot F(\theta_k)}{(\theta_{kj} - \theta_{ij})^2} \cdot \frac{(\theta_{kj} - \theta_{ij})}{|(\theta_{kj} - \theta_{ij})|} \quad (6)$$

Consequently, equation (2) can be reformed into equation (7), below:

$$x_{ij}(t+1) = \theta_{ij}(t) + F_{ikj} \cdot (\theta_{ij}(t) - \theta_{kj}(t)) \quad (7)$$

Since universal gravitation is considered, extending the consideration between the employed bee, which is picked by the onlooker bee, and more than one employed bees is achievable by adding different $F_{ik} \cdot (\theta_i - \theta_k)$ into equation (7). Accordingly, the gravitation $F_{ik}$, plays the role of a weight factor, controlling the specific weight of $(\theta_i - \theta_k)$.

The normalization process is taken in order to ensure that $F_{ik} \in [0, 1]$. Through the normalization of $F_{ik}$, the constant G can be eliminated. Assuming that there is one picked employed bee and two selected employed bees, an example of the elimination of G in two terms of considering objects $k = \{1, 2\}$ is described in equations (8) through (10), where $F_{ik}$ is the normalized gravitation.

$$F_{ik} = \left\{ \left| G \frac{F(\theta_i) \cdot F(\theta_k)}{(\theta_k - \theta_i)^2} \cdot \frac{\theta_k - \theta_i}{|\theta_k - \theta_i|} \right| \right\} \Big|_{k=1,2} \quad (8)$$

$$\text{Total}(F_{ik})|_{k=1,2} = \sum_{k=1}^{2} \left[ \frac{F(\theta_i) \cdot F(\theta_k)}{(\theta_k - \theta_i)^2} \right] \quad (9)$$

$$= G \frac{F(\theta_i) \cdot F(\theta_1)}{(\theta_1 - \theta_i)^2} + G \frac{F(\theta_i) \cdot F(\theta_2)}{(\theta_2 - \theta_i)^2}$$

$$F_{ik} = \frac{\left| G \frac{F(\theta_i) \cdot F(\theta_k)}{(\theta_k - \theta_i)^2} \cdot \frac{\theta_k - \theta_i}{|\theta_k - \theta_i|} \right|}{\text{Total}(F_{ik})} \quad (10)$$

$$= G \frac{F(\theta_i) \cdot F(\theta_k)}{(\theta_k - \theta_i)^2} \cdot \frac{\theta_k - \theta_i}{|\theta_k - \theta_i|} \Bigg/$$

$$G \frac{F(\theta_i) \cdot F(\theta_1)}{(\theta_1 - \theta_i)^2} + G \frac{F(\theta_i) \cdot F(\theta_2)}{(\theta_2 - \theta_i)^2}$$

$$= \cancel{G} \frac{F(\theta_i) \cdot F(\theta_k)}{(\theta_k - \theta_i)^2} \cdot \frac{\theta_k - \theta_i}{|\theta_k - \theta_i|} \Bigg/$$

$$\cancel{G} \frac{F(\theta_i) \cdot F(\theta_1)}{(\theta_1 - \theta_i)^2} + \cancel{G} \frac{F(\theta_i) \cdot F(\theta_2)}{(\theta_2 - \theta_i)^2} \Bigg|_{k=1,2}$$

By applying the term $F_{ik}$ into equation (7) and simultaneously considering the gravitation between the picked employed bee and n selected employed bees, it is clear that equation (7) can be reformed again into equation (11):

$$x_{ij}(t+1) = \theta_{ij}(t) + \sum_{k=1}^{n} \tilde{F}_{ikj} \cdot (\theta_{ij}(t) - \theta_{kj}(t)) \qquad (11)$$

The process of the Interactive Artificial Bee Colony (IABC) can be described in 5 steps, which are similar to the conventional Artificial Bee Colony algorithm.

Step 1 is Initialization. Randomly spread $n_e$ percent of the population into the solution space, where $n_e$ indicates the ratio of employed bees to the total population.

Step 2 is Move the Onlookers. Move the onlookers by (11) with roulette wheel strategy based on the probabilities calculated by (1).

Step 3 is Move the Scouts. When the iteration matches the multiples of the predefined "Limit" iteration, the employed bees, whose fitness values are not improved, become the scouts. In IABC, two employed bees fitting the condition are retained, and the rest of the employed bees satisfying the condition listed above are moved by (3).

Step 4 is Update the Near Best Solution. Memorize the near best fitness value and the corresponding coordinate found so far by the bees.

Step 5 is Termination Checking. If the termination condition is satisfied, exit the program; otherwise, go back to step 2.

Applying the IABC to solve the problems of optimization, the control' parameter n should be predetermined. Experimental results have shown that a preferred value for n is 4. The IABC presents a stable and realizable capacity to find the near best solutions in an optimization problem such as the offline weight mask optimization. The IABC reads in the concept of universal gravitation to the movement of onlooker bees in the ABC, and successfully increases the exploration ability of the ABC. Introducing the essence of the universal gravitation into the movement of the onlooker bees and efficient application thereof solves the combinational optimization problem associated with discovering optimized weighing masks used for facial recognition.

It is to be understood that the present invention is not limited to the embodiments described above, but encompasses any and all embodiments within the scope of the following claims.

We claim:

1. A computer-implemented passive continuous authentication method, comprising the steps of:
    registering at least one facial image of a user into a user image database;
    iteratively determining, during the registering step, a set of weighting masks associated with the user's at least one facial image stored in the user image database, the weighting masks being optimized by applying an interactive artificial bee colony optimization procedure to raw data of the user's at least one facial image stored in the user image database, the interactive artificial bee colony optimization procedure having a fitness function that seeks to minimize within cluster distances and between cluster distances of the raw facial image data during the optimization procedure, the iteratively determining step continuing until a stopping criterion is reached;
    allowing a registered user in the user image database to log into and use a computing resource;
    continuously authenticating, in real time, captured image frames in the vicinity of the computing resource against the user's registered at least one facial image in the image database, the continuously authenticating step including:
    determining Eigenface values associated with the real-time captured image frames;
    applying the optimized weighting masks to the Eigenface values, thereby providing processed real-time captured image frames; and
    comparing the processed captured image frames to the user's registered at least one image;
    continuing to allow use of the computing resource so long as there is a match between the processed captured image frames and the user's registered at least one facial image in the image database; and
    disallowing use of the computing resource when there is a mismatch between the processed captured image frames and the user's registered at least one facial image in the image database.

2. The computer-implemented passive continuous authentication method according to claim 1, wherein said continuously authenticating step further comprises the steps of:
    detecting skin regions of a person present in the captured image frames; and
    comparing the similarity of the person's facial image and the clothes color to the similarly located regions of said user's at least one facial image stored in said user image database.

3. The computer-implemented passive continuous authentication method according to claim 1, further comprising the steps of:
    storing the registered user's soft biometric data along with the registered user's facial data in said image registration database; and
    selectively authenticating soft biometric data presented in the captured image frames against the registered user's soft biometric data stored in said image registration database.

4. The computer-implemented passive continuous authentication method according to claim 1, wherein said facial image registering step further comprises the steps of:
    attempting to detect the user's eyes; and
    rotating the user's facial image only if the user's eyes have been detected.

5. The computer-implemented passive continuous authentication method according to claim 1, wherein said continuously authenticating step further comprises the steps of:
    attempting to detect the eyes of a person in the vicinity of the computing resource; and
    rotating the person's facial image only if the person's eyes have been detected.

6. The computer-implemented passive continuous authentication method according to claim 1, wherein said facial image registering step further comprises the step of detecting skin color of the user.

7. The computer-implemented passive continuous authentication method according to claim 1, wherein said continuously authenticating step further comprises the step of detecting skin color of a person in the vicinity of the computing resource.

8. The computer-implemented passive continuous authentication method according to claim 1, further comprising the steps of:
    utilizing first Haar-like features to detect a frontal facial portion of users and persons in the vicinity of the computer resource; and utilizing second Haar-like features to detect eye location of the frontal facial portion of the users and the persons in the vicinity of the computer resource.

9. The computer-implemented passive continuous authentication method according to claim 1, wherein said at least one facial image comprises a plurality of images, the registering step further comprising storing a plurality of images per user in said image registration database.

10. The computer-implemented passive continuous authentication method according to claim 9, wherein said step of storing a plurality of images per user further comprises the steps of:
   comparing distance measurements between facial features of a user in subsequent images to distance measurements between facial features in the images of the same user stored in the database; and
   storing the subsequent images only if the distance measurements in the subsequent images are within a predetermined tolerance of the distance measurements in the stored images of the same user.

11. A computer software product, comprising a non-transitory medium readable by a processor, the medium having stored thereon a set of instructions for performing a passive continuous authentication method, the set of instructions including:
   (a) a first sequence of instructions which, when executed by the processor, causes said processor to register a user's facial image into a user image database;
   (b) a second sequence of instructions which, when executed by the processor, causes said processor to iteratively determine during the registering a set of weighting masks associated with the user's facial image stored in the user image database, the weighting masks being optimized by applying an interactive artificial bee colony optimization procedure to raw data of the user's facial image stored in the user image database, the interactive artificial bee colony optimization procedure having a fitness function that seeks to minimize within cluster distances and between cluster distances of the raw facial image data during the optimization procedure, the iteratively determining step continuing until a stopping criterion is reached;
   (c) a third sequence of instructions which, when executed by the processor, causes said processor to allow a registered user in the user image database to log into and use a computing resource;
   (d) a fourth sequence of instructions which, when executed by the processor, causes said processor to continuously authenticate, in real time, captured image frames in the vicinity of the computing resource versus the user's registered image in the image database, the continuously authenticating including the steps of determining Eigenface values associated with the real-time captured image frames, applying the optimized weighting masks to the Eigenface values, thereby providing processed real-time captured image frames, and comparing the processed captured image frames to the user's registered image;
   (e) a fifth sequence of instructions which, when executed by the processor, causes said processor to continue to allow use of the computing resource so long as there is a match between the processed captured image frames and the user's registered image in the image database; and
   (f) a sixth sequence of instructions which, when executed by the processor, causes said processor to disallow use of the computing resource when there is a mismatch between the processed captured image frames and the user's registered image in the image database.

12. The computer software product according to claim 11, further comprising a seventh sequence of instructions which, when executed by the processor, causes said processor to detect skin regions of a person present in said captured image frames, and to compare the person's clothes color to similarly located clothes color in the user's facial image stored in said user image database.

13. The computer software product according to claim 11, further comprising:
   an eighth sequence of instructions which, when executed by the processor, causes said processor to store the registered user's soft biometric data along with the registered user's facial data in said image registration database; and
   a ninth sequence of instructions which, when executed by the processor, causes said processor to selectively authenticate soft biometric data presented in the captured image frames versus the registered user's soft biometric data stored in said image registration database.

14. The computer software product according to claim 11, wherein said first sequence of instructions further comprises:
   a tenth sequence of instructions which, when executed by the processor, causes said processor to attempt to detect the user's eyes; and
   an eleventh sequence of instructions which, when executed by the processor, causes said processor to rotate the user's facial image only if the user's eyes have been detected.

15. The computer software product according to claim 11, wherein said fourth sequence of instructions further comprises:
   a twelfth sequence of instructions which, when executed by the processor, causes said processor to attempt to detect eyes of a person in the vicinity of the computing resource; and
   a thirteenth sequence of instructions which, when executed by the processor, causes said processor to rotate the person's facial image only if the person's eyes have been detected.

16. The computer software product according to claim 11, wherein said first sequence of instructions further comprises a fourteenth sequence of instructions which, when executed by the processor, causes said processor to detect skin regions of the user.

17. The computer software product according to claim 16, wherein said fourth sequence of instructions further comprises a fifteenth sequence of instructions which, when executed by the processor, causes said processor to detect skin regions of a person in the vicinity of the computing resource.

18. The computer software product according to claim 11, further comprising:
   a sixteenth sequence of instructions which, when executed by the processor, causes said processor to utilize first Haar-like features to detect a frontal facial portion of users and persons in the vicinity of the computer resource; and
   a seventeenth sequence of instructions which, when executed by the processor, causes said processor to utilize second Haar-like features to detect eye location of the frontal facial portion of the users and the persons in the vicinity of the computer resource.

19. The computer software product according to claim 11, further comprising an eighteenth sequence of instructions which, when executed by the processor, causes said processor to store a plurality of images per user in said image registration database.

20. The computer software product according to claim 11, further comprising:
   a nineteenth sequence of instructions which, when executed by the processor, causes said processor to compare distance measurements between facial features of a user in subsequent images to distance measurements between facial features in a first image of the same user stored in the database; and
   a twentieth sequence of instructions which, when executed by the processor, causes said processor to store the subsequent images only if the distance measurements in the subsequent images are within a predetermined tolerance of the distance measurements in the stored images of the same user.

\* \* \* \* \*